United States Patent

Takano

[19]

[11] Patent Number: 5,631,810

[45] Date of Patent: May 20, 1997

[54] CONTROL OF SWITCHING DEVICES IN SYNCHRONIZED-RECTIFICATION SYSTEM

[75] Inventor: Yoshinori Takano, Tokyo, Japan

[73] Assignee: NEC Corporation, Japan

[21] Appl. No.: 563,687

[22] Filed: Nov. 28, 1995

[30] Foreign Application Priority Data

Nov. 28, 1994 [JP] Japan .................. 6-317679

[51] Int. Cl.[6] ............................................. H02M 3/335
[52] U.S. Cl. .......................................... 363/21; 323/282
[58] Field of Search ........................... 323/282; 363/21, 363/41

[56] References Cited

U.S. PATENT DOCUMENTS

| 5,128,603 | 7/1992 | Wolfel ........................... 363/21 |
| 5,173,847 | 12/1992 | Suzuki ........................... 363/21 |
| 5,229,928 | 7/1993 | Karlsson et al. ............... 363/65 |
| 5,303,138 | 4/1994 | Rozmen ......................... 363/21 |
| 5,336,985 | 8/1994 | McKenzie ...................... 323/282 |
| 5,400,239 | 3/1995 | Caine ............................. 363/21 |
| 5,519,599 | 5/1996 | Shinada et al. ................ 363/21 |

FOREIGN PATENT DOCUMENTS

| 4-127869 | 4/1992 | Japan . |
| 4-150777 | 5/1992 | Japan . |

*Primary Examiner*—Stuart N. Hecker
*Attorney, Agent, or Firm*—Ostrolenk, Faber, Gerb & Soffen, LLP

[57] ABSTRACT

A switch controller in a DC—DC converter performs the switching control of a primary switch and a freewheel switch which are connected to the primary and the secondary of a transformer, respectively. The switch controller comprises a control voltage generator for generating two control voltages having a predetermined voltage difference, a triangular-wave oscillator for generating a triangular-wave voltage, and a control pulse generator for generating two control pulse signals which cause the primary switch and the freewheel switch to alternately turn on and off such that both the primary switch and the freewheel switch become off during a certain period when one of the primary switch and the freewheel switch is turned off.

20 Claims, 6 Drawing Sheets

T : DELAY TIME PERIOD
D : DEAD TIME PERIOD

T: DELAY TIME PERIOD
D: DEAD TIME PERIOD

CONTROL OF SWITCHING DEVICES IN SYNCHRONIZED-RECTIFICATION SYSTEM

BACKGROUND OF THE INVENTION

1. Field of the Invention

The present invention generally relates to a DC—DC converter employing a synchronized-rectification system and, in particular, to the control of switching devices for use in the synchronized-rectification system.

2. Description of the Related Art

With the reduction of voltages supplied to integrated circuits, a small-sized DC—DC converter for supplying a low voltage at high efficiency has been required. To obtain such a converter, there is widely used a synchronized-rectification system comprising metal-oxide-semiconductor field-effect transistors (MOSFETs) which are caused to operate in synchronization with primary switching.

FIG. 1 is a circuit diagram showing an example of a conventional DC—DC converter. Referring to FIG. 1, a MOSFET 1 is connected to the primary of a transformer TR to perform the primary switching. The secondary of the transformer TR is connected to a rectifying circuit comprising a rectifier 2 and a freewheel MOSFET 3, and the rectifying circuit is in turn connected to a smoothing circuit comprising a choke coil 4 and a capacitor 5. Monitoring a DC output voltage of the converter, a controller 6 controls a control pulse generator 8 through an insulating circuit 7 such that a control pulse signal P output by the control pulse generator 8 varies in pulse width according to the DC output voltage of the converter. The control pulse generator 8 outputs the control pulse signal P to both the gate of the primary MOSFET 1 through an inverter 9 and the gate of the freewheel MOSFET 3 through an insulating circuit 10.

In the above conventional circuit arrangement, when the DC output voltage of the converter increases, the control pulse generator 8 causes the pulse width of the control pulse signal P to be shortened, resulting in the reduced ON-state period during which the primary MOSFET 1 is forced into conduction. Therefore, the primary MOSFET 1 operates to reduce the DC output voltage of the converter. Conversely, when the DC output voltage of the converter decreases, the control pulse generator 8 causes the pulse width of the control pulse signal P to become longer, resulting in the increased ON-state period during which the primary MOSFET 1 is forced into conduction. Therefore, the primary MOSFET 1 operates to increase the DC output voltage of the converter. In this manner, the DC output voltage of the converter can be kept constant by controlling the ON-state period of the primary MOSFET 1.

However, because of a delay in operation of the inverter 9 and the insulating circuit 10, there is inevitably a difference in operation timing between the primary MOSFET 1 and the freewheel MOSFET 3. In addition, the primary MOSFET 1 and the freewheel MOSFET 3 employ different type mossiest suitable for primary switching and freewheel switching, respectively. Therefore, the primary MOSFET 1 and the freewheel MOSFET 3 usually have different gate capacitance and different conduction resistance. This causes an additional difference in operation timing thereof. As a result, in the conventional converter, there may occur a phenomenon that the primary switch MOSFET 1 and the freewheel MOSFET 3 are concurrently rendered in the ON state, especially in a high-frequency switching operation. Such a concurrent conduction state causes the secondary of the transformer TR to be short-circuited during that period, resulting in the reduced efficiency of the converter.

Another synchronized-rectifying circuit is disclosed in Japanese Patent Unexamined Publication No. 4-150777. This circuit is designed to eliminate the need for the auxiliary winding of the transformer by using control pulses with dead time periods to perform ON-OFF control of the rectifying MOSFET and the freewheel MOSFET.

Still another synchronized-rectifying circuit is disclosed in Japanese Patent Unexamined Publication No. 4-127869. This circuit is comprised of two variable delay circuits which delays a primary switching pulse by controlled time intervals, respectively, and outputs the respective delayed switching pulses to the rectifying MOSFET and the freewheel MOSFET. The delay time intervals are adjusted to eliminate the recovery current and the channel current reversely flowing through the rectifying MOSFET and the freewheel MOSFET so as to eliminate the recovery loss and the loss caused by the channel current.

However, these conventional rectifying circuits employ the rectifying MOSFET connected to the secondary of the transformer and are designed to perform the ON-OFF control of both the rectifying MOSFET and the freewheel MOSFET. In addition, these circuits have no feedback control configuration where the DC output voltage of the converter is detected and fed back to the primary of the transformer so that the switching operation of the primary MOSFET is controlled based on the DC output voltage.

SUMMARY OF THE INVENTION

An object of the present invention is to provide a high-efficiency DC—DC converter.

Another object of the present invention is to provide a control system and method of switching devices in a synchronized-rectifying circuit without reducing the efficiency of a DC—DC converter.

A further object of the present invention is to provide a switching regulator which is capable of maintaining a high efficiency even when power supply input conditions and/or load conditions are changed.

A switch controller according to the present invention performs the switching control of a primary switch and a freewheel switch which are connected to the primary and the secondary of a transformer, respectively, such that both the primary switch and the freewheel switch become off during a certain period when one of the primary switch and the freewheel switch is turned off. More specifically, the switch controller is comprised of a control voltage generator for generating two control voltages having a predetermined voltage difference, a periodic varying voltage generator for generating a periodic varying voltage having a predetermined inclination in voltage such as a triangular-wave voltage, and a control pulse generator for generating two control pulse signals supplied to the primary switch and the freewheel switch, respectively.

The control pulse generator is comprised of a timing detector, a comparator, a state retaining circuit and a driver. The timing detector detects a time instant at which the periodic varying voltage reaches a peak voltage or a bottom voltage of the periodic varying voltage. The comparator compares the periodic varying voltage with each of the first control voltage and the second control voltage. When the periodic varying voltage reaches the first control voltage from the start voltage, the comparator generates a first timing signal. Subsequently, when the periodic varying voltage reaches the second control voltage, the comparator generates a second timing signal.

According to the time instant, the first timing signal and the second timing signal, the state retaining circuit such as a flip-flop circuit retains a first output signal and a second output signal at one of an active state and an inactive state. The first output signal and the second output signal are concurrently changed to the active state and the inactive state at the time instant, respectively. When receiving the first timing signal from the comparator, the first output signal is changed from the active state to the inactive state with the second output signal remaining inactive. The second output signal is then changed from the inactive state to the active state when receiving the second timing signal from the comparator. The driver drives the primary switch and the freewheel switch according to the first output signal and the second output signal, respectively. More specifically, the primary switch and the freewheel switch are forced into conduction (ON) when the first and second output signals are active, the primary switch and the freewheel switch are forced into non-conduction (OFF) when the first and second output signal are inactive.

DETAILED DESCRIPTION OF THE PREFERRED EMBODIMENTS

Figure 1:
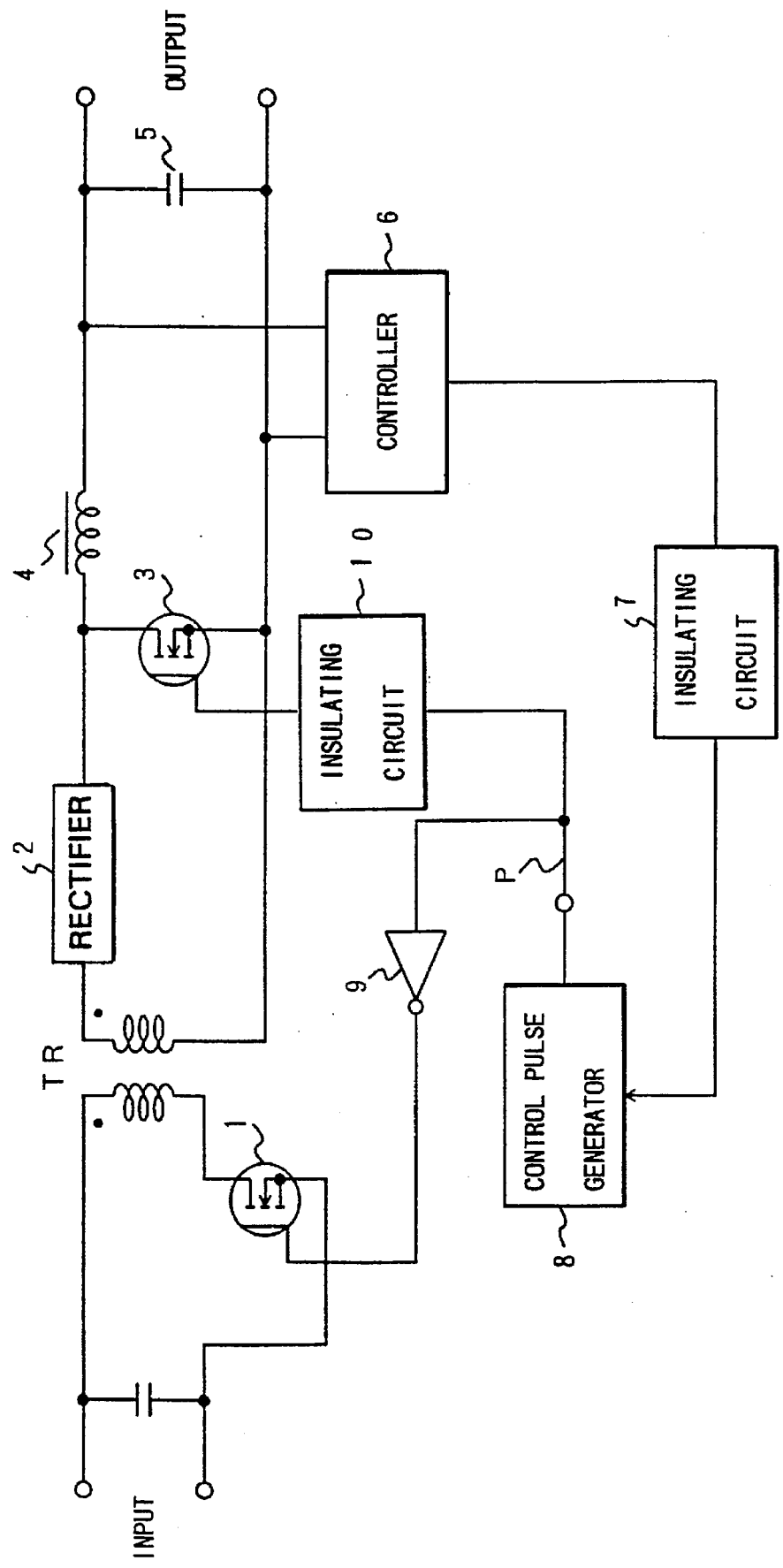
FIG. 1 is a block diagram showing an example of a conventional DC—DC converter.
Figure 2:
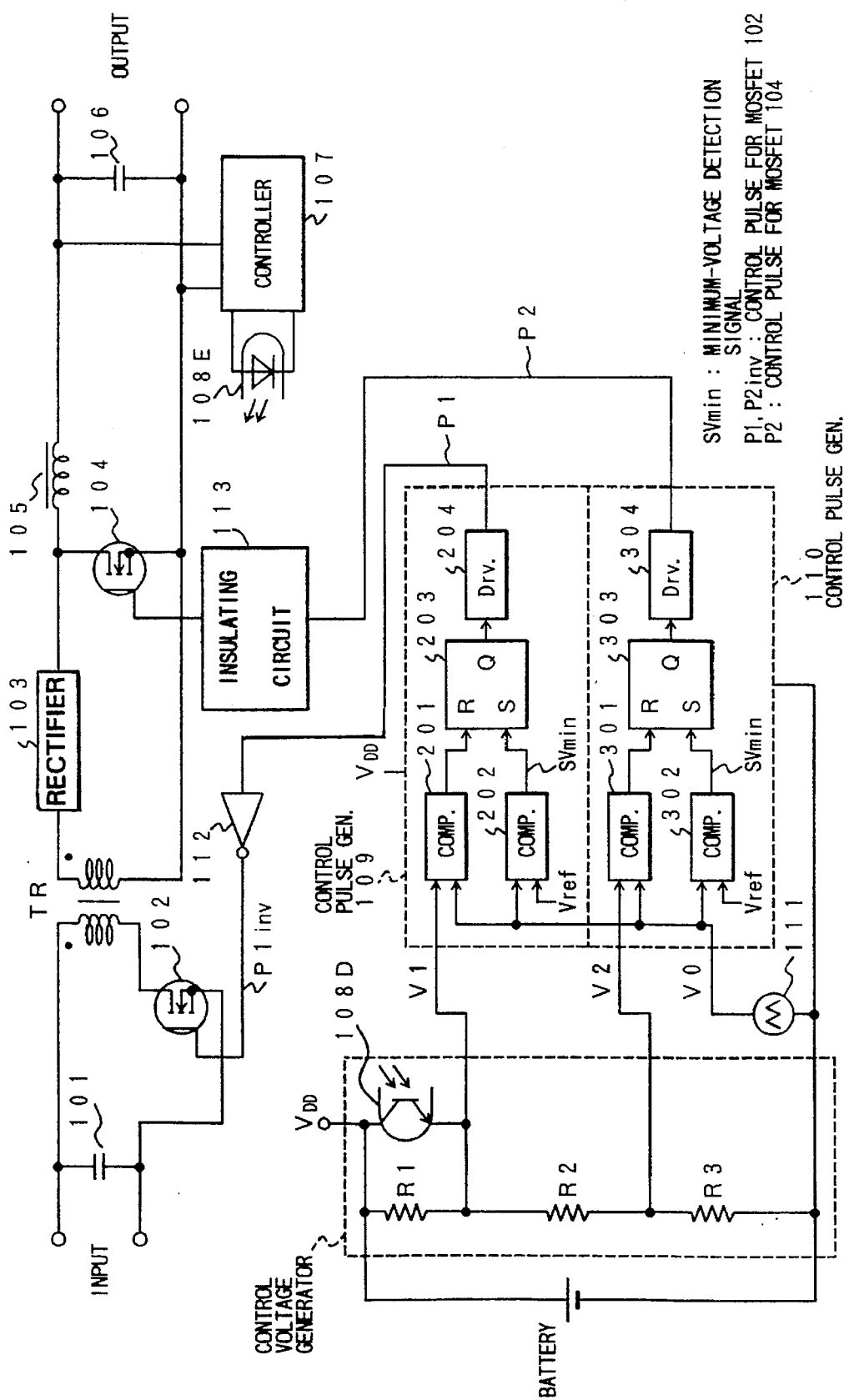
FIG. 2 is a block diagram showing the circuit configuration of a first embodiment of a DC—DC converter according to the present invention.

As shown in FIG. 2, an input capacitor 101 and a primary switch MOSFET 102 are connected to the primary of a transformer TR. A rectifying circuit comprising a rectifier 103 and a freewheel MOSFET 104 is connected to the secondary of the transformer TR, and a smoothing circuit comprising a choke coil 105 and an output capacitor 106 is connected to the rectifying circuit.

Monitoring a DC output voltage across the output capacitor 106 of the converter, a controller 107 controls an insulating circuit 108, for example, a photocoupler 108 comprising a light-emitting diode 108E and a photodetector 108D. More specifically, the controller 107 changes the amount of light emitted from the light-emitting diode 108E in accordance with the DC output voltage of the converter. The impedance of the photodetector 108D varies according to the light amount received from the light-emitting diode 108E.

A control voltage generator is comprised of the photodetector 108D and resistors R1, R2 and R3. The resistors R1, R2 and R3 are connected in series and the resistor R1 is connected in parallel to the photodetector 108D, thereby to form a voltage divider which divides a reference voltage $V_{DD}$ supplied from a battery to generate two control voltages V1 and V2. Since the impedance of the photodetector 108D varies according to the light amount received from the light-emitting diode 108E, the control voltages V1 and V2 are changed in accordance with the DC output voltage of the converter while maintaining the relationship V1>V2.

The respective control voltages V1 and V2 are output to control pulse generators 109 and 110. The control pulse generators 109 and 110 also receive a triangular-wave voltage V0 from a triangular-wave oscillator 111 and output control pulse signals P1 and P2 to the primary MOSFET 102 and the freewheel MOSFET 104 through an inverter 112 and an insulating circuit 113, respectively. The insulating circuit 113 may comprise a photocoupler.

In the present embodiment, the control pulse generators 109 and 110 have the same circuit configuration formed with an integrated circuit (IC) so called a timer IC. The control pulse generator 109 is comprised of comparators 201, 202, a flip-flop circuit 203 and a driver 204. Similarly, the control pulse generator 110 is comprised of comparators 301, 302, a flip-flop circuit 303 and a driver 304.

As to the control pulse generator 109, receiving the control voltage V1 from the control voltage generator and the triangular-wave voltage V0 from the triangular-wave oscillator 111, the comparator 201 compares the control voltage V1 with the triangular-wave voltage V0 and outputs a reset signal to the flip-flop circuit 203 when the triangular-wave voltage V0 is equal to or greater than the control voltage V1. The comparator 202 compares the triangular-wave voltage V0 with a reference voltage Vref to detect the minimum-voltage timing of the triangular-wave voltage V0. More specifically, the comparator 202 outputs a minimum-voltage detection signal SVmin to the flip-flop circuit 203 when the triangular-wave voltage V0 reaches the minimum voltage level. When receiving the minimum-voltage detection signal Svmin of the logical value 1 from the comparator 202, the flip-flop circuit 203 is forced into a SET state in which the output Q of the value 1 is output to the driver 204. When receiving the reset signal of 1 from the comparator 201, the flip-flop circuit 203 is forced into a RESET state in which the output Q of the value 0 is output to the driver 204. In other words, the control pulse signal P1 goes high every time the triangular-wave voltage Vo reaches the minimum-voltage level and goes low when the triangular-wave voltage Vo reaches the control voltage V1. In a case where the timer IC is used as the control pulse generator, the control voltage V1 is received at the control terminal and the triangular-wave voltage V0 at the threshold terminal and the trigger terminal.

Similarly, as to the control pulse generator 110, receiving the control voltage V2 from the control voltage generator and the triangular-wave voltage V0 from the triangular-wave oscillator 111, the comparator 301 compares the control voltage V2 with the triangular-wave voltage V0 and outputs a reset signal to the flip-flop circuit 303 when the triangular-wave voltage V0 is equal to or greater than the control voltage V2. The comparator 302 compares the triangular-wave voltage V0 with a reference voltage Vref to detect the minimum-voltage timing of the triangular-wave voltage V0. More specifically, the comparator 302 outputs a minimum-voltage detection signal SVmin to the flip-flop circuit 303 when the triangular-wave voltage V0 reaches the minimum voltage level. When receiving the minimum-voltage detection signal Svmin of the logical value 1 from the comparator 302, the flip-flop circuit 303 is forced into a SET state in which the output Q of the value 1 is output to the driver 304. When receiving the reset signal of 1 from the comparator 301, the flip-flop circuit 303 is forced into a RESET state in which the output Q of the value 0 is output to the driver 304. In other words, the control pulse signal P2 goes high every time the triangular-wave voltage Vo reaches the minimum-voltage level and goes low when the triangular-wave voltage Vo reaches the control voltage V2. In a case where the timer IC is used as the control pulse generator, the control voltage V2 is received at the control terminal and the triangular-wave voltage V0 at the threshold terminal and the trigger terminal.

Since the control voltage V2 is lower than the control voltage V1, the control pulse signal P2 falls to a logical low earlier than the control pulse signal P1, as described later. The control pulse generator 109 outputs the control pulse signal P1 to the inverter 112 where the control pulse signal P1 is logically inverted. The inverted control pulse signal $P1_{inv}$ is output as the primary switching pulse to the gate of the primary MOSFET 102. The control pulse generator 110 outputs the control pulse signal P2 as the freewheel switching pulse to the gate of the freewheel MOSFET 104 through the insulating circuit 113 such as a photocoupler.

Figure 3:
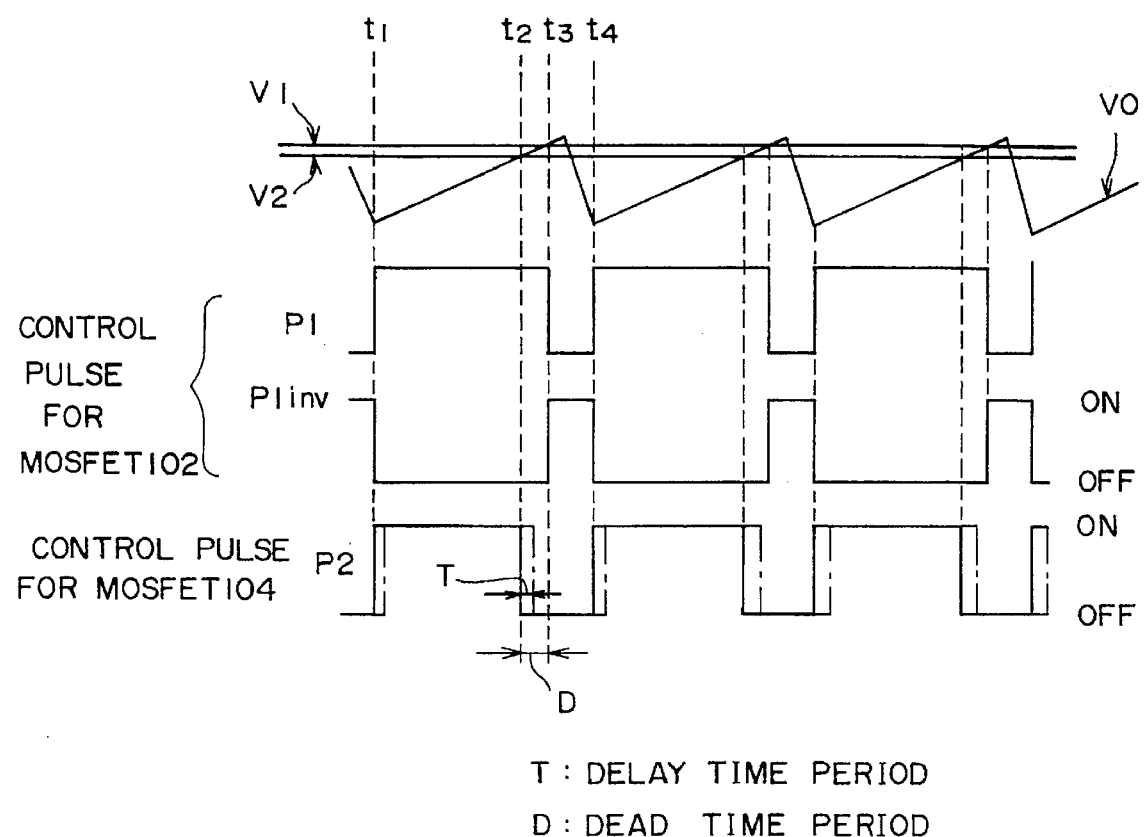
FIG. 3 is a waveform chart showing an operation of the first embodiment.

Referring to FIG. 3, at the time instant $t_1$ when the triangular-wave voltage Vo reaches the minimum-voltage level, the comparators 202 and 302 output the minimum-voltage detection signal Svmin as a SET signal to the flip-flop circuits 203 and 303, respectively. Therefore, the control pulse signal P1 and P2 concurrently rise to a logical high, which means that the inverted control pulse signal $P1_{inv}$ falls to a logical low and the control pulse signal P2 rises to a logical high at the same time. After that, the triangular-wave voltage V0 is gradually rising and then first reaches the control voltage V2 lower than the control voltage V1. At the time instant $t_2$ when the triangular-wave voltage V0 reaches the control voltage V2, the flip-flop circuit 303 of the control pulse generator 110 is forced into the RESET state, and thereby the control pulse signal P2 falls to the logical low, causing the freewheel MOSFET 104 to switch off. Subsequently, the triangular-wave voltage V0 reaches the control voltage V1. At the time instant $t_3$ when the triangular-wave voltage V0 reaches the control voltage V1, the flip-flop circuit 203 of the control pulse generator 109 is forced into the RESET state, and thereby the control pulse signal P1 falls to the logical low, causing the primary MOSFET 102 to switch on. At the time instant $t_4$ when the triangular-wave voltage Vo reaches the minimum-voltage level again, the inverted control pulse signal $P1_{inv}$ goes low and the control pulse signal P2 goes high, that is, the primary MOSFET 102 is forced into non-conduction and the freewheel MOSFET 104 into conduction.

As described above, the difference between the control voltages V1 and V2 generates a dead time period D from the time instant $t_2$ to $t_3$. The length of the dead time period D may be so set as to absorb a delay time period T including a delay in operation of the inverter 112 and the insulating circuit 113 as well as a delay in the switching operation of the freewheel MOSFET 104. The length of the dead time period D can be easily set by properly selecting a set of the resistors R1–R3.

It is apparent from FIG. 3 that the respective pulse widths of the control pulse signals $P1_{inv}$ and P2 vary in accordance with the variation of the control voltages V1 and V2. Referring to FIG. 3, since the increase of the output voltage of the converter causes the control voltages V1 and V2 to increase, the pulse width of the control pulse $P1_{inv}$ for the primary MOSFET 102 is shortened, resulting in the reduced output voltage of the converter. Conversely, when the output voltage of the converter decreases, the control voltage V1 is decreased, causing the pulse width of the control pulse V1 to increase, resulting in the increased output voltage of the converter. In such a manner, the output voltage of the converter can be kept constant.

The triangular-wave voltage Vo is not restricted to the waveform as shown in FIG. 3. The triangular waveform as shown in FIG. 3 may be turned from top to bottom into a reversed triangular waveform. In this case, a peak voltage is detected from the reversed triangular-wave voltage by the comparators 202 and 302, and furthermore the inverter 112 is removed from the control pulse generator 109 to the control pulse generator 110. Such a configuration can be applied to a rectifying system having a delay in the operation of the primary MOSFET 102.

Figure 4:
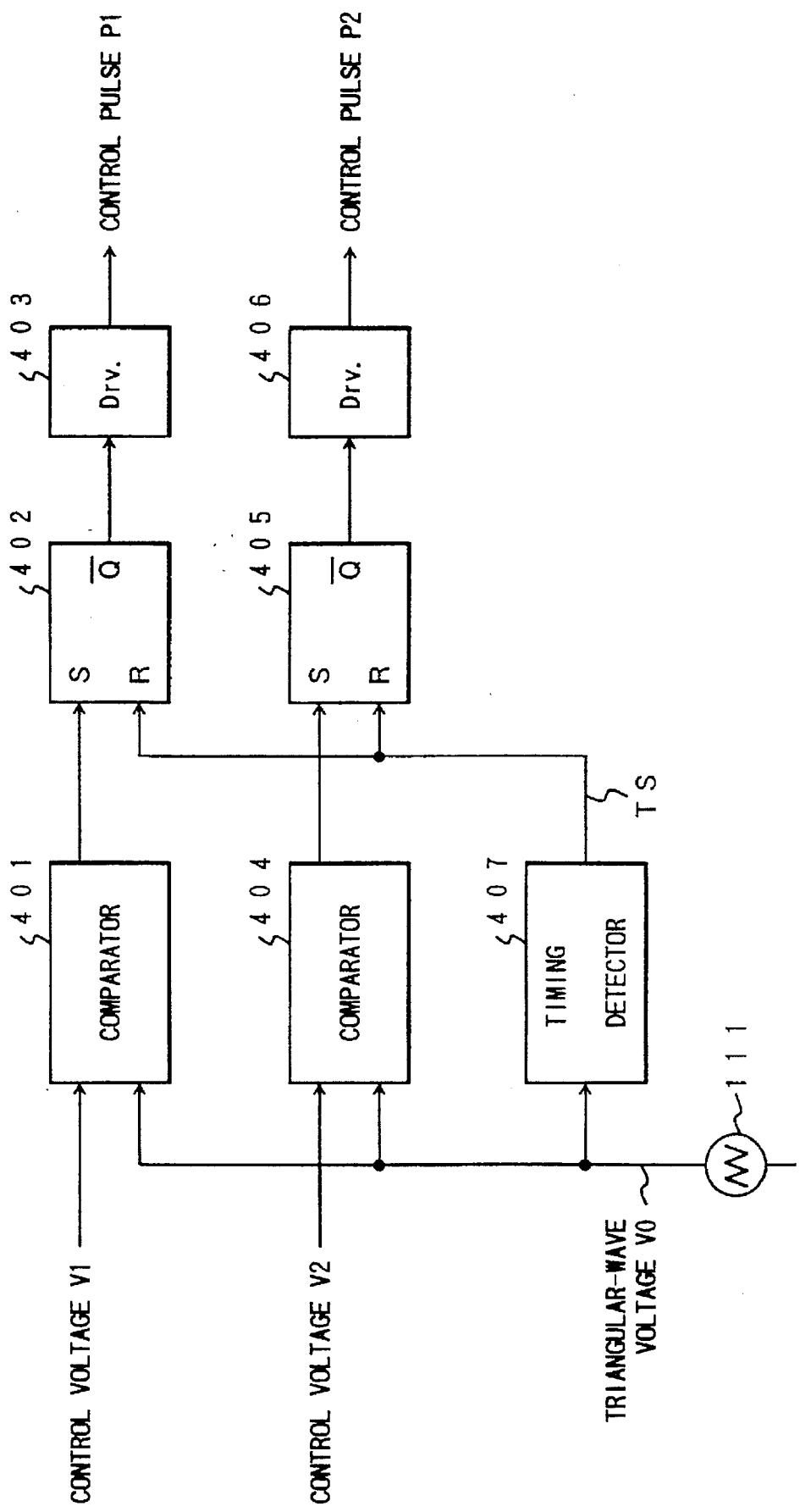
FIG. 4 is a block diagram showing the circuit configuration of a control pulse generator for use in a second embodiment according to the present invention.

FIG. 4 shows a schematic circuit of a control pulse generator for use in the second embodiment according to the present invention. Referring to FIG. 4, a comparator 401 receives the control voltage V1 from the control voltage generator and the triangular-wave voltage V0 from the triangular-wave oscillator 111, and compares the control voltage V1 with the triangular-wave voltage V0 to output a set signal to a flip-flop circuit 402 when the triangular-wave voltage V0 is equal to or greater than the control voltage V1. The inverted output of the flip-flop circuit 402 is output to the driver 403. Similarly, a comparator 404 receives the control voltage V2 from the control voltage generator and the triangular-wave voltage V0 from the triangular-wave oscillator 111, and compares the control voltage V2 with the triangular-wave voltage V0 to output a set signal to a flip-flop circuit 405 when the triangular-wave voltage V0 is equal to or greater than the control voltage V2. The inverted output of the flip-flop circuit 405 is output to the driver 406.

A timing detector 407 detects the time instants at which the triangular-wave voltage V0 reaches a predetermined level such as the lowest or highest level by monitoring the triangular-wave voltage V0. The timing signal TS is output from the timing detector 407 as a reset signal to the flip-flop circuits 402 and 405. It is apparent that this control pulse generator has the above-mentioned advantages as described and shown in FIG. 3.

Figure 5:
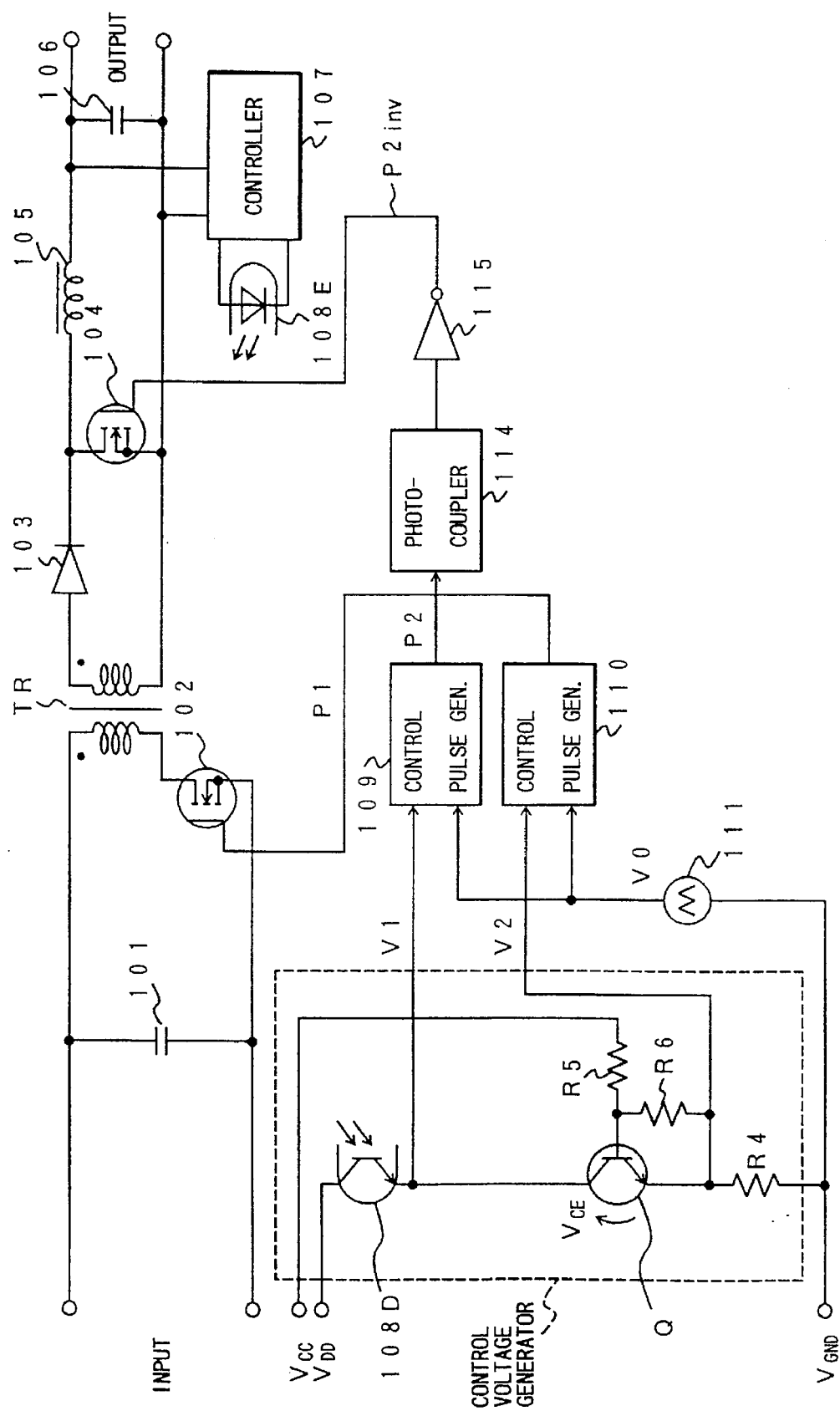
FIG. 5 is a block diagram showing the circuit configuration of a third embodiment of a DC—DC converter according to the present invention.

As shown in FIG. 5 where circuit parts similar to those previously described with reference to FIG. 2 are denoted by the same reference numerals, the control pulse generator 109 outputs the control pulse signal P2 to the gate of the freewheel MOSFET 104 through a photocoupler 114 and then an inverter 115. The control pulse generator 110 outputs the control pulse signal P1 to the gate of the primary MOSFET 102.

In this embodiment, in order to generate the control voltages V1 and V2, the control voltage generator employs a level-shift transistor Q instead of the resistor R2. More specifically, a power supply voltage Vcc and the resistors R4–R6 are so set that an NPN transistor Q connected in series to the photodetector 108D operates in a saturation region. Therefore, a difference between the control voltages V1 and V2 becomes equal to a collector-emitter saturation voltage Vce of the NPN transistor Q, and is always kept constant irrespective of the impedance variation of the photodetector 108D. In other words, the dead time period D which is determined by the difference between the control voltages V1 and V2 can be kept constant with high accuracy. The collector-emitter saturation voltage Vce of the NPN transistor Q can be set by its bias circuit comprising the resistors R5 and R6.

Figure 6:
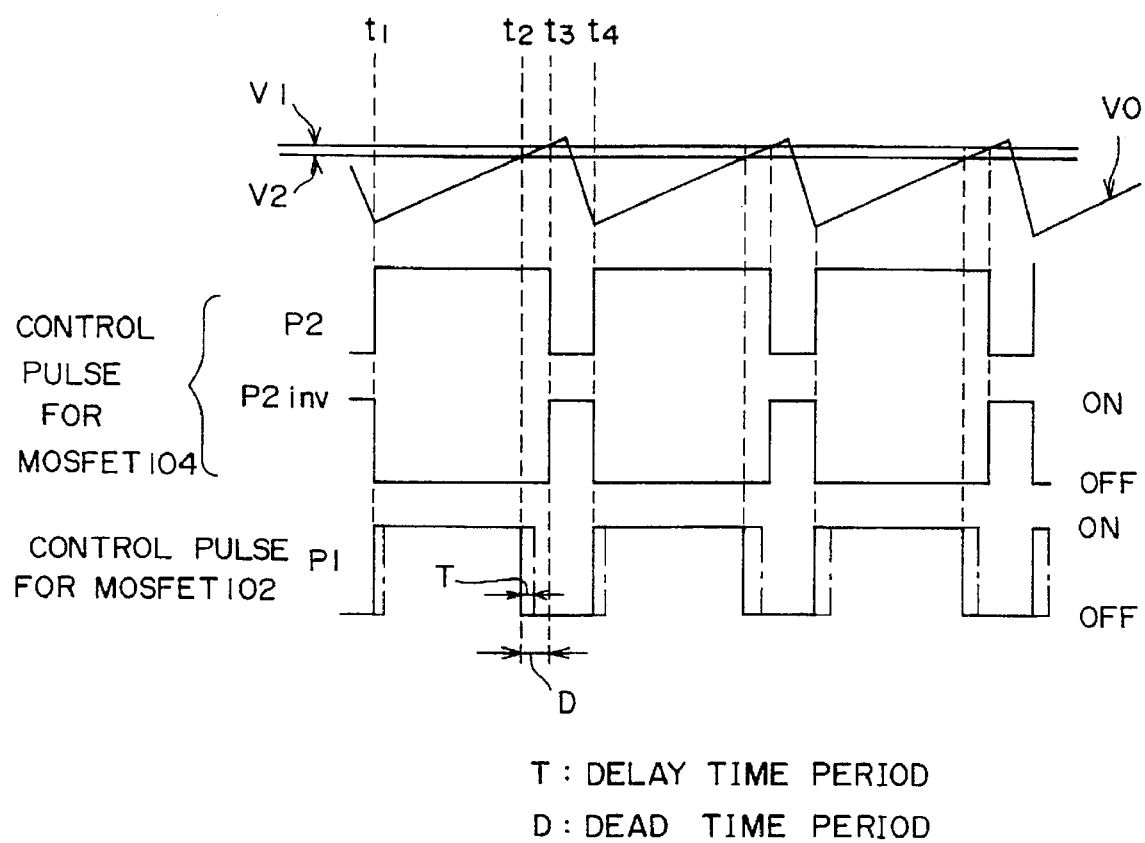
FIG. 6 is a waveform chart showing an operation of the third embodiment.

As shown in FIG. 6, at the time instant $t_1$ when the triangular-wave voltage Vo reaches the minimum-voltage level, the control pulse signals P1 and P2 concurrently rise to a logical high as described above, which means that the inverted control pulse signal $P2_{inv}$ falls to a logical low and the control pulse signal P1 rises to a logical high at the same time. After that, the triangular-wave voltage V0 is gradually rising and then first reaches the control voltage V2 lower than the control voltage V1. At the time instant $t_2$ when the triangular-wave voltage V0 reaches the control voltage V2, the control pulse signal P1 falls to the logical low, causing the primary MOSFET 102 to switch off. Subsequently, the triangular-wave voltage V0 reaches the control voltage V1. At the time instant $t_3$ when the triangular-wave voltage V0 reaches the control voltage V1, the control pulse signal P2 falls to the logical low, causing the freewheel MOSFET 104 to switch on. At the time instant $t_4$ when the triangular-wave voltage Vo reaches the minimum-voltage level again, the inverted control pulse signal $P2_{inv}$ goes low and the control pulse signal P1 goes high, that is, the primary MOSFET 102 is forced into conduction and the freewheel MOSFET 104 into non-conduction. As described above, the difference between the control voltages V1 and V2 generates a dead time period D from the time instant $t_2$ to $t_3$. The length of the dead time period D may be so set as to absorb a delay time period T including a delay in the switching operation of the primary MOSFET 102.

What is claimed is:

1. A controller for performing control of a primary switch and a freewheel switch provided in a DC—DC converter, said primary switch connected to the primary of a transformer, and said freewheel switch connected to the secondary of said transformer, said controller comprising:

control voltage generating means for generating a first control voltage and a second control voltage which have a predetermined voltage difference, said first control voltage being associated with said primary switch, and said second control voltage being associated with said freewheel switch;

periodic voltage generating means for generating a periodic varying voltage having a predetermined inclination in voltage;

detecting means for detecting a time instant at which said periodic varying voltage reaches a start voltage selected from a peak voltage and a bottom voltage of said periodic varying voltage;

comparing means for comparing said periodic varying voltage with each of said first control voltage and said second control voltage, generating a first timing signal when said periodic varying voltage reaches said first control voltage from said start voltage, and generating a second timing signal when said periodic varying voltage reaches said second control voltage from said start voltage;

state retaining means for retaining a first output signal and a second output signal at one of an active state and an inactive state based on said time instant, said first timing signal and said second timing signal, said first output signal and said second output signal concurrently changing to said active state and said inactive state at said time instant, respectively, said first output signal changing from said active state to said inactive state when receiving said first timing signal from said comparing means, and said second output signal changing from said inactive state to said active state when receiving said second timing signal from said comparing means; and driving means for driving said primary switch and said freewheel switch according to said first output signal and said second output signal, respectively, such that said primary switch is on when said first output signal is active, said freewheel switch is on when said second output signal is active, said primary switch is off when said first output signal is inactive, and said freewheel switch is off when said second output signal is inactive.

2. The controller according to claim 1, wherein said comparing means comprises:

a first comparator for comparing said periodic varying voltage with said first control voltage to generate said first timing signal when said periodic varying voltage reaches said first control voltage from said start voltage; and a second comparator for comparing said periodic varying voltage with said second control voltage to generate said second timing signal when said periodic varying voltage reaches said second control voltage from said start voltage, said state retaining means comprise:

a first flip-flop circuit for retaining said first output signal; and a second flip-flop circuit for retaining said second output signal, and said driving means comprises:

a first driver comprising an inverter through which said first output signal is transferred to said primary switch for on-off control; and a second driver comprising an insulating circuit through which said second output signal is transferred to said freewheel switch for on-off control.

3. The controller according to claim 1, wherein said comparing means comprises:

a first comparator for comparing said periodic varying voltage with said first control voltage to generate said first timing signal when said periodic varying voltage reaches said first control voltage from said start voltage; and a second comparator for comparing said periodic varying voltage with said second control voltage to generate said second timing signal when said periodic varying voltage reaches said second control voltage from said start voltage, said state retaining means comprise:

a first flip-flop circuit for retaining said first output signal; and a second flip-flop circuit for retaining said second output signal, and said driving means comprises:

a first driver through which said first output signal is transferred to said primary switch for on-off control; and a second driver comprising an inverter and an insulating circuit connected in series through which said second output signal is transferred to said freewheel switch for on-off control.

4. The controller according to claim 1, wherein said detecting means, said comparing means, said state retaining means and said driving means are formed with a first timer integrated circuit and a second timer integrated circuit, said first timer integrated circuit comprising:

a first detecting means for detecting said time instant;

a first comparator for comparing said periodic varying voltage with said first control voltage to generate said first timing signal when said periodic varying voltage reaches said first control voltage from said start voltage;

a first flip-flop circuit for retaining said first output signal; and a first driver for driving said primary switch according to said first output signal such that said primary switch is on when said first output signal is active and off when said first output signal is inactive; and said second timer integrated circuit comprising:
  a second detecting means for detecting said time instant;
  a second comparator for comparing said periodic varying voltage with said second control voltage to generate said second timing signal when said periodic varying voltage reaches said second control voltage from said start voltage;
  a second flip-flop circuit for retaining said second output signal; and
  a second driver for driving said primary switch according to said second output signal such that said primary switch is on when said second output signal is active and off when said second output signal is inactive.

5. The controller according to claim 4, wherein:
  said first timer integrated circuit is connected to an inverter through which an output of said first driver is transferred to said primary switch for on-off control; and
  said second timer integrated circuit is connected to an insulating circuit through which an output of said second driver is transferred to said freewheel switch for on-off control.

6. The controller according to claim 4, wherein:
  said first timer integrated circuit outputs an output of said first driver to said primary switch for on-off control; and
  said second timer integrated circuit is connected to an inverter and an insulating circuit connected in series through which an output of said second driver is transferred to said freewheel switch for on-off control.

7. The controller according to claim 1, wherein said periodic voltage generating means comprises a triangular-wave oscillator which generates said periodic varying voltage having a triangular waveform.

8. The controller according to claim 4, wherein said periodic voltage generating means comprises a triangular-wave oscillator which generates said periodic varying voltage having a triangular waveform.

9. A DC—DC converter comprising:
  a transformer for transferring an electrical energy from a DC power supply to a load;
  a first switch connected to the primary of said transformer, for switching on and off according to a first control pulse signal to supply said electrical energy to said transformer;
  a rectifier connected to the secondary of said transformer, for rectifying an output of said transformer;
  a second switch connected to said secondary of said transformer through said rectifier, for switching on and off according to a second control pulse signal;
  a smoothing circuit connected to said second switch, comprising an element for storing said electrical energy output from said rectifier;
  control voltage generating means for generating a first control voltage and a second control voltage lower than said first control voltage by a predetermined voltage, both said first control voltage and said second control voltage varying according to a DC output voltage of said smoothing circuit;
  periodic voltage generating means for generating a periodic varying voltage having a predetermined inclination in voltage;
  detecting means for detecting a time instant at which said periodic varying voltage reaches a start voltage selected from a peak voltage and a bottom voltage of said periodic varying voltage;
  comparing means for comparing said periodic varying voltage with each of said first control voltage and said second control voltage, generating a first timing signal when said periodic varying voltage reaches said first control voltage from said start voltage, and generating a second timing signal when said periodic varying voltage reaches said second control voltage from said start voltage;
  state retaining means for retaining a first output signal and a second output signal at one of an active state and an inactive state based on said time instant, said first timing signal and said second timing signal, said first output signal and said second output signal concurrently changing to said active state and said inactive state at said time instant, respectively, said first output signal changing from said active state to said inactive state when receiving said first timing signal from said comparing means, and said second output signal changing from said inactive state to said active state when receiving said second timing signal from said comparing means; and
  driving means for driving said primary switch and said freewheel switch according to said first output signal and said second output signal, respectively, such that said primary switch is on when said first output signal is active, said freewheel switch is on when said second output signal is active, said primary switch is off when said first output signal is inactive, and said freewheel switch is off when said second output signal is inactive.

10. The DC—DC converter according to claim 9, wherein said detecting means, said comparing means, said state retaining means and said driving means are formed with a first timer integrated circuit and a second timer integrated circuit,
  said first timer integrated circuit comprising:
    a first detecting means for detecting said time instant;
    a first comparator for comparing said periodic varying voltage with said first control voltage to generate said first timing signal when said periodic varying voltage reaches said first control voltage from said start voltage;
    a first flip-flop circuit for retaining said first output signal; and
    a first driver for driving said primary switch according to said first output signal such that said primary switch is on when said first output signal is active and off when said first output signal is inactive; and
  said second timer integrated circuit comprising:
    a second detecting means for detecting said time instant;
    a second comparator for comparing said periodic varying voltage with said second control voltage to generate said second timing signal when said periodic varying voltage reaches said second control voltage from said start voltage;
    a second flip-flop circuit for retaining said second output signal; and
    a second driver for driving said primary switch according to said second output signal such that said primary switch is on when said second output signal is active and off when said second output signal is inactive.

11. The DC—DC converter according to claim 10, wherein:

said first timer integrated circuit is connected to an inverter through which an output of said first driver is transferred to said primary switch for on-off control; and said second timer integrated circuit is connected to an insulating circuit through which an output of said second driver is transferred to said freewheel switch for on-off control.

12. The DC—DC converter according to claim 10, wherein:

said first timer integrated circuit outputs an output of said first driver to said primary switch for on-off control; and said second timer integrated circuit is connected to an inverter and an insulating circuit connected in series through which an output of said second driver is transferred to said freewheel switch for on-off control.

13. The DC—DC converter according to claim 9, wherein said periodic voltage generating means comprises a triangular-wave oscillator which generates said periodic varying voltage having a triangular waveform.

14. The DC—DC converter according to claim 9, is a switching regulator.

15. The DC—DC converter according to claim 9, wherein said control voltage generating means comprises:

a feedback means for feeding back said DC output voltage of said smoothing circuit; and three level-shift means connected in series to which a reference voltage is applied, said three level-shift means comprising:

a single level-shift means comprising a variable-impedance element for varying in impedance according to said DC output voltage fed back through said feedback means; and two other level-shift means each causing a predetermined voltage drop to generate said first control voltage and said second control voltage, respectively.

16. The DC—DC converter according to claim 15, wherein said feedback means comprises a feedback controller and a photocoupler, said photocoupler comprising a light-emitting element and a photodetector, said feedback controller controlling the amount of light emitted by said light-emitting element according to said DC output voltage; and said variable-impedance element comprising said photodetector.

17. The DC—DC converter according to claim 15, wherein said two other level-shift means each comprise a bipolar transistor operating in a saturation region.

18. A control method of a primary switch and a freewheel switch provided in a DC—DC converter, said primary switch connected to the primary of a transformer, and said freewheel switch connected to the secondary of said transformer, said method comprising the steps of:

generating a first control voltage and a second control voltage which have a predetermined voltage difference, said first control voltage being associated with said primary switch, and said second control voltage being associated with said freewheel switch;

generating a periodic varying voltage having a predetermined inclination in voltage;

detecting a time instant at which said periodic varying voltage reaches a start voltage selected from a peak voltage and a bottom voltage of said periodic varying voltage;

comparing said periodic varying voltage with each of said first control voltage and said second control voltage to generate a first timing signal when said periodic varying voltage reaches said first control voltage from said start voltage and to generate a second timing signal when said periodic varying voltage reaches said second control voltage from said start voltage;

retaining a first output signal and a second output signal at one of an active state and an inactive state based on said time instant, said first timing signal and said second timing signal, said first output signal and said second output signal concurrently changing to said active state and said inactive state at said time instant, respectively, said first output signal changing from said active state to said inactive state when said first timing signal is generated, and said second output signal changing from said inactive state to said active state when said second timing signal is generated; and driving said primary switch and said freewheel switch according to said first output signal and said second output signal, respectively, such that said primary switch is on when said first output signal is active, said freewheel switch is on when said second output signal is active, said primary switch is off when said first output signal is inactive, and said freewheel switch is off when said second output signal is inactive.

19. The control method according to claim 18, wherein said first output signal and said second output signal are both inactive during a period from when said first timing signal is generated to when said second timing signal is generated.

20. The control method according to claim 18, wherein said periodic varying voltage has a triangular waveform.

* * * * *